US008045851B2

(12) United States Patent
Lu et al.

(10) Patent No.: US 8,045,851 B2
(45) Date of Patent: Oct. 25, 2011

(54) METHOD AND APPARATUS FOR AUTOMATIC RESTORATION DETECTION AND AUTOMATIC RESTORATION OF OPTICAL COMMUNICATION SYSTEM

(75) Inventors: Yiquan Lu, Shenzhen (CN); Congqi Li, Shenzhen (CN); Hao Wang, Shenzhen (CN); Juan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 942 days.

(21) Appl. No.: 11/958,045

(22) Filed: Dec. 17, 2007

(65) Prior Publication Data

US 2008/0240713 A1    Oct. 2, 2008

Related U.S. Application Data

(63) Continuation of application No. PCT/CN2006/001447, filed on Jun. 26, 2006.

(30) Foreign Application Priority Data

Sep. 30, 2005   (CN) .......................... 2005 1 0112528

(51) Int. Cl.
*G02F 1/00*   (2006.01)
(52) U.S. Cl. ..................................... 398/6; 398/5; 398/7
(58) Field of Classification Search ................ 398/3, 4, 398/5, 6, 7, 2, 12, 19
See application file for complete search history.

(56) References Cited

U.S. PATENT DOCUMENTS

| | | | |
|---|---|---|---|
| 4,633,246 A | 12/1986 | Jones et al. | |
| 5,003,531 A | 3/1991 | Farinholt et al. | |
| 5,159,595 A | 10/1992 | Flanagan et al. | |
| 5,367,395 A | 11/1994 | Yajima et al. | 398/17 |

(Continued)

FOREIGN PATENT DOCUMENTS

CN            1189269            7/1998

(Continued)

OTHER PUBLICATIONS

International Telecommunication Union, "Optical Safety Procedures and Requirements for Optical Transport Systems," ITU-T Recommendation G.664 (2006).

(Continued)

*Primary Examiner* — M. R. Sedighian
(74) *Attorney, Agent, or Firm* — Slater & Matsil, L.L.P.

(57) ABSTRACT

Methods and apparatuses for automatic restoration detection and automatic restoration of optical communication system are disclosed. In the methods, a first station sends an automatic restoration detection message to a second station at the opposite side of a failed link; in response to receiving an automatic restoration request message, determines that the link has been repaired in two directions, and sends an automatic restoration confirmation message to the second station; or in response to receiving the automatic restoration detection message, determines that the link from the second station to the first station has been repaired, and sends the automatic restoration request message to the second station; in response to receiving the automatic restoration confirmation message, determines that the link has been repaired in two directions; and switching to normal working states. The safety problem that the laser leakage occurs in the failed link is solved.

28 Claims, 6 Drawing Sheets

U.S. PATENT DOCUMENTS

| | | | |
|---|---|---|---|
| 5,442,623 A * | 8/1995 | Wu | 370/224 |
| 6,820,269 B2 | 11/2004 | Baucke et al. | |
| 2002/0114060 A1 | 8/2002 | Kobayashi et al. | 359/334 |
| 2003/0016411 A1* | 1/2003 | Zhou et al. | 359/110 |
| 2003/0169470 A1* | 9/2003 | Alagar et al. | 359/110 |
| 2004/0042063 A1 | 3/2004 | Ohtani et al. | 359/341.3 |
| 2005/0004937 A1 | 1/2005 | Colarik | 707/103 X |
| 2005/0132214 A1 | 6/2005 | Naftali | |
| 2005/0185957 A1 | 8/2005 | Ohtani et al. | 398/33 |

FOREIGN PATENT DOCUMENTS

| | | |
|---|---|---|
| EP | 0 581 138 | 2/1994 |
| EP | 1 175 051 A2 | 1/2002 |
| WO | WO 03/069812 | 8/2003 |

OTHER PUBLICATIONS

European Office Action for Application No. 06753022.0, dated Dec. 8, 2009.

International Preliminary Report on Patentability for Application No. PCT/CN2006/001447, dated Sep. 19, 2006.

International Search Report for International Application No. PCT/CN2006/001447, dated Oct. 26, 2006.

ITU, "Optical Safety Procedures and Requirements for Optical Transport Systems," Series G: Transmission Systems and Media, Digital Systems and Networks, pp. 1-19 (2003).

Supplementary European Search Report for Application No. EP06753022, dated Aug. 4, 2008.

* cited by examiner

METHOD AND APPARATUS FOR AUTOMATIC RESTORATION DETECTION AND AUTOMATIC RESTORATION OF OPTICAL COMMUNICATION SYSTEM

CROSS-REFERENCE TO RELATED APPLICATIONS

This is a continuation of International Application No. PCT/CN2006/001447, filed Jun. 26, 2006, which claims the priority benefit of Chinese Patent Application No. 20051011528.9, filed Sep. 30, 2005, the entire respective disclosures of which are incorporated herein by reference.

FIELD OF THE INVENTION

The present invention relates to the optical communication technology, and more particularly to an automatic restoration method, a method for automatic restoration detection and apparatuses for automatic restoration of optical communication system in response to a failure on an optical fiber link.

BACKGROUND OF THE INVENTION

Because of the excellent directivity, the power density of laser in the output direction is especially high, which greatly threatens human eyes. The wavelength of lasers used in the existing communication system is generally around 870 nm, 1310 nm and 1550 nm, which are all beyond the wavelength range of visible light. Because it is invisible to the naked eye, the light beam has a greater possibility to hurt human eyes. After the inventions of Erbium-Doped Fiber Amplifier (EDFA) and Wavelength Division Multiplexing (WDM) techniques, the output power of optical signals carried in fibers is even higher than that of conventional Synchronous Digital Hierarchy (SDH) devices. In addition, such apparatuses as RAMAN amplifier may be introduced into the existing communication system, which makes the power of optical signals carried in fibers of some systems reach or even exceed 30 dBm. Such high power of the optical signal greatly threatens the safety of operators and maintenance personnel of telecommunication system.

The safety level of laser apparatus and device is defined in Standard IEC60825, which specifies the specific operational measure and safety identifier as well. The International Telecommunication Union-Telecommunication Standardization Sector (ITU-T) constitutes Standard G.664 for laser safety in communication system. According to the Standard G.664, an optical communication apparatus should be able to automatically reduce the output power to a power threshold for safety and even turn off a laser when a laser leakage occurs. The solution is expressed as an Automatic Power Reduction (APR) and an Automatic Power Shutdown (APSD) solution in G.664.

SUMMARY OF THE INVENTION

Embodiments of the present invention provide a method and optical amplifier for automatic restoration in optical communication system, which may implement automatic restoration of optical communication system after a failed link has been repaired, avoid the potential safety problems in the automatic restoration procedure, and reduce safety venture; the method is also applicable to the system without an Optical Monitoring Channel (OSC) for the method without the participation of the OSC.

Further, embodiments of the present invention also provide a method for automatic restoration detection in optical communication system after a link fails to implement the reliable failure automatic detection in the automatic restore process.

A method for automatic restoration of optical communication system includes:

after a link fails in an optical communication system, entering a failure state by two automatic restoration launching stations adjacent to the failed link, and starting automatic restoration timing respectively;

sending, by a first automatic restoration launching station which finishes the automatic restoration timing first, an automatic restoration detection message whose optical power is compatible with a safety standard to a second automatic restoration launching station at the opposite side of the failed link;

in response to receiving the automatic restoration detection message, determining, by the second automatic restoration launching station, that the link has been repaired in a direction from the first automatic restoration launching station to the second automatic restoration launching station, and sending an automatic restoration request message whose optical power is compatible with the safety standard to the first automatic restoration launching station;

in response to receiving the automatic restoration request message, determining, by the first automatic restoration launching station, the link has been repaired in two directions between the first automatic restoration launching station and the second automatic restoration launching station, and sending an automatic restoration confirmation message whose optical power is compatible with the safety standard to the second automatic restoration launching station;

in response to receiving the automatic restoration confirmation message, determining, by the second automatic restoration launching station, the link has been repaired in two directions between the first automatic restoration launching station and the second automatic restoration launching station;

switching to the normal working state by two automatic restoration launching stations.

Optionally, the method further includes:

after the automatic restoration launching stations start automatic restoration timing respectively, sending, by the first automatic restoration launching station which finishes the automatic restoration timing, a first detection optical signal whose optical power is compatible with the safety standard to the second automatic restoration launching station, and waiting for a preset time;

after the second automatic restoration launching station detects the first detection optical signal, turning on a first auxiliary pump source on the link from the first automatic restoration launching station to the second automatic restoration launching station;

after the first automatic restoration launching station sends the automatic restoration detection message to the second automatic restoration launching station, the method further comprising:

in response to receiving the automatic restoration detection message, sending, by the second automatic restoration launching station, a second detection optical signal whose optical power is compatible with the safety standard to the first automatic restoration launching station, and waiting for a preset time;

after the first automatic restoration launching station detects the second detection optical signal, turning on a second auxiliary pump source on the link from the second automatic restoration launching station to the first automatic restoration launching station.

A method for automatic restoration detection of optical communication system after a link fails, includes:

sending, by a automatic restoration launching station at one side of a failed link, an identification signal to a automatic restoration launching station at the opposite side of the failed link; wherein the identification signal represents an automatic restoration detection message and is loaded into a main optical channel whose optical power is compatible with a safety standard;

detecting, by the automatic restoration launching station it the opposite side of the failed link, if the identification signal is detected, determining that the link through which the identification signal passes has been repaired; if the identification signal is not detected, determining that the link through which the identification signal passes has not been repaired.

An optical amplifier for automatic restoration of optical communication system, includes:

a gain component for amplifying am inputted optical signal before outputting the optical signal;

a pump laser component for providing a pump light for the gain component;

a control component, comprising an control module for generating and controlling the pump current of the pump laser component;

and the control component further includes:

a control signal generating module, for adjusting the pump current to enable the output pump current of the control component to carry a control signal, and the control signal controlling the wave motion of the pump light in compliance with a determined wave motion to enable the output signal of the optical amplifier to carry a predetermined identification signal.

An optical amplifier for automatic restoration of optical communication system, includes:

a gain component, for outputting the inputted optical signal after amplifying it;

a pump laser component, for providing a pump light for the gain component;

a control component, comprising an control module for generating and controlling the pump current of pump laser component;

and the gain component further includes:

a signal light intensity modulation module, for controlling the intensity change of the output signal of optical amplifier according to the input control signal to load a predetermined identification signal on the output signal for output.

As can be seen from the above scheme, the embodiments of the present invention restore the normal working state of failed link after multiple handshakes between automatic restore launching stations under a safety standard, which reduces the potential safety problems in the process of fixing the link and guarantees that no safety problem like the laser leakage occurs in the failed link. The traditional automatic restore always needs to be performed between two Optical Terminal Multiplexing (OTM) stations, however, according to the embodiments of the present invention; the automatic restoration may be implemented between amplifier stations. The restoration time can be reduced because the current restoration method is executed between the adjacent amplifier stations and no amplifier restarting time is needed. With this automatic restoration method, the automatic restoration problem with such an auxiliary pump facility as a RAMAN amplifier may be solved effectively. In addition, the method does not need the participation of the OSC, which is suitable to more cases.

By the method for automatic restoration detection in optical communication system after a link fails, the state interaction is dependent on message transfer instead of light power, and the detection pulse is short, so the danger that the laser leakage would exceed a safety threshold in the process of transmitting an automatic restoration detection pulse is avoided, and the laser safety performance of optical communication system is further improved.

DETAILED DESCRIPTION OF THE INVENTION

Figure 1:
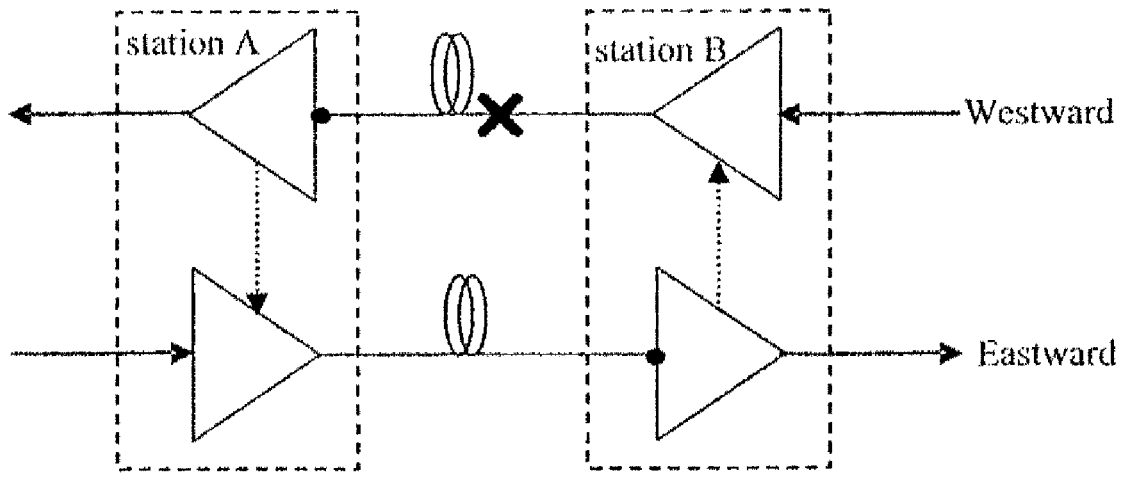
FIG. 1 is a schematic diagram illustrating an APR procedure of optical amplifier.

An APR is implemented by adding a link state detecting component and a laser output control component in an optical communication device. As shown in FIG. 1, when there is a potential laser leakage because of a failure on the westward fiber from station B to station A, the westward optical amplifier of station A will detect loss of the optical signal sent from station B by the link state detecting component, and determine that there is a potential laser leakage on the fiber from station B to station A. The potential laser leakage may also exist on the fiber from station A to station B; therefore, the westward optical amplifier of station A will notify the eastward optical amplifier of station A to reduce the output power to make the laser leakage on the fiber from station A to station B be compatible with the safety level constituted by Standard IEC60825. Therefore, operators and maintenance personnel are protected. The eastward optical amplifier of station B will detect power reduction or loss of the eastward optical signal. The eastward optical amplifier of station B performs the same procedure described above. In other words, the eastward optical amplifier of station B notifies the westward optical amplifier of station B to reduce the output power to make the laser leakage from station A to station B compatible with the safety level constituted by Standard IEC60825.

The implementation procedure of APSD is similar to that of APR, and a difference is that the APSD solution directly shuts down the laser or optical amplifier, rather than reduces the output power to a power threshold for safety.

Figure 2:
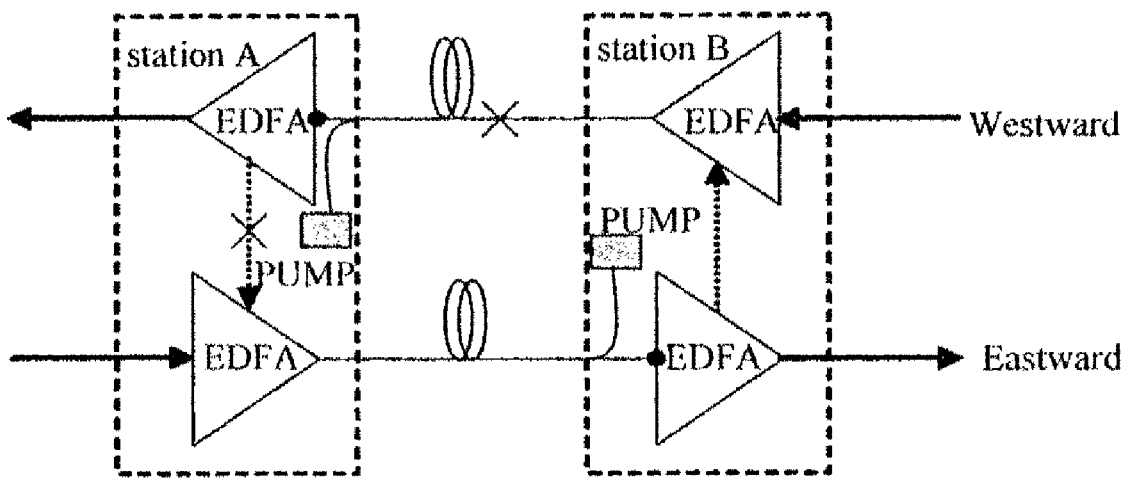
FIG. 2 is a schematic diagram illustrating an APR procedure of optical amplifier with RAMAN amplifiers.

The APR and the APSD of the existing communication apparatuses are basically implemented by detecting optical power. In other words, when the optical power in the receiving direction is abnormal, optical power output in its reverse direction is reduced or shut down at once, so the laser leakage in the reverse direction is controlled within an allowable range specified in the safety standard, and the opposite side device is also notified to perform protection procedure. The key of the APR and the APSD solutions is detecting whether the received optical power is below a threshold to decide whether there is a potential laser leakage on the fiber. However, APR is unavailable with optical power detection alone where RAMAN amplifiers or remotely-pumped amplifiers exist. As shown in, FIG. 2, when a RAMAN amplifier or a remotely-pumped amplifier exists, the pump light of the RAMAN amplifier or the remotely-pumped amplifier is often inputted to the transmission fiber in the reverse direction of signal light. Because the output power of pump light is usually higher than that of signal light, the pump output of RAMAN amplifier or remotely-pumped amplifier will be shut down or reduced for safety.

After an APR or APSD procedure is initiated, automatic restoration is needed after the optical fiber link has been repaired.

In an automatic restoration method, an Optical Terminal Multiplexing (OTM) station sends a single detection pulse to the downstream in a direction; in response to detecting the light power of the detection pulse, a downstream optical amplifier determines that the upstream link in the direction has been repaired, and sends the detection pulse to the downstream along the same direction after amplifying the detection pulse, at last, the detection pulse is sent to a downstream OTM station in the direction; in response to receiving the detection pulse, the downstream OTM station increases the output power to the normal case in a reverse direction. Likewise, the light in the reverse direction will be amplified by optical amplifiers along the reverse direction. If the link is restored, the OTM station, which initiates the detection pulse, detects the light in reverse direction, and confirms that the network has been repaired, and the whole restore procedure is accomplished.

Figure 3:
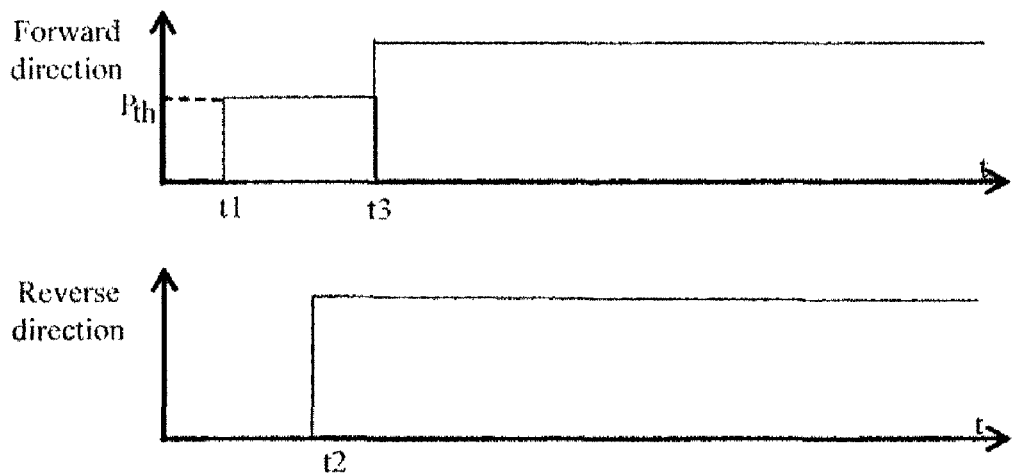
FIG. 3 is a schematic diagram illustrating an ARP or APSD automatic restoration procedure.

FIG. 3 is a schematic diagram illustrating the procedure above. An upstream OTM station outputs a detection pulse as a restoration request at time t1. The power of the detection pulse is lower than or equal to a power threshold for safety. If the forward link of the optical fiber has been repaired, a downstream OTM station will detect the detection pulse, and increase the output power to the normal case in the reverse link at time t2 with a time delay from time t1. In response to detecting the power of the light in the reverse link at time t3, the upstream OTM station learns that the network has been repaired and increases the output power to the normal case; therefore, the working in the whole link is restored.

If the forward link has not been repaired, the downstream OTM station is unable to detect the detection pulse, and will not turn on the light path in the reverse direction. The upstream OTM station will receive no feedback, and will stop outputting the detection pulse after a preset time expires.

If the reverse link has not been repaired, the light outputted by the downstream OTM station is unable to arrive at the upstream OTM station. The upstream OTM station will stop outputting the detection pulse for detecting no feedback optical signal in the preset time.

The above method for the upstream sending a signal pulse and the downstream detecting the power of the pulse may also be performed between Optical Transfer Segments (OTS) of optical transfer link (i.e. between the two adjacent stations) other than be performed between two OTM stations.

With the above method in the existing art, automatic restoration can be implemented in optical communication system, however, laser safety problems still exists. For example, in the above procedure, if the reverse link has not been repaired, the downstream OTM station still increases the output power to the normal case in the reverse link in response to receiving the detection pulse sent from the upstream in the forward link. It is dangerous for the worker who is maintaining the link, especially when auxiliary amplifying facilities are employed in the link. For example, if a RAMAN amplifier or a remotely-pumped amplifier is employed in the link, a severe laser leakage may occur.

Optical Monitoring Channel (OSC) is recommended to implement automatic restoration in Recommendation G.664 (2003 version) published by ITU-T. As a result, two stations adjacent to a failure fiber can determine whether the optical fiber link has been repaired each other dependent on the participation of OSC, which further improves the safety of the system. However, OSC is necessary for the method which is not suitable to a case without OSC.

Embodiments of the present invention provide an automatic restoration method of optical communication system. When a failure occurs on a link of an optical communication system, two automatic restoration launching stations next to the failed link enter a failure state, and start automatic restoration timing respectively. The two automatic restoration launching stations may be two OTM stations of failed link or two stations adjacent to the failed link. A first automatic restoration launching station which finishes the automatic restoration timing first sends an automatic restoration detection message whose optical power is compatible with the safety standard to a second automatic restoration launching station at the opposite side of the failed link. In response to receiving the automatic restoration detection message, the second automatic restoration launching station determines that the optical fiber link through which the message passes has been repaired, and sends an automatic restoration request message whose optical power is compatible with the safety standard to the first automatic restoration launching station. In response to receiving the automatic restoration request message, the first automatic restoration launching station determines that the link has been repaired in two directions, and sends an automatic restoration confirmation message whose optical power is compatible with the safety standard to the second automatic restoration launching station. In response to receiving the automatic restoration confirmation message, the second automatic restoration launching station determines that the link has been repaired in two directions. The two automatic restoration launching stations restore to the normal working states. By the method, power of the main optical channel is increased to the normal case after at least three handshakes between the two automatic restoration launching stations, so that no safety problem such as laser leakage will occur in the failed link.

A detailed description is hereinafter provided with reference to preferred embodiments and the accompany drawings.

Figure 4:
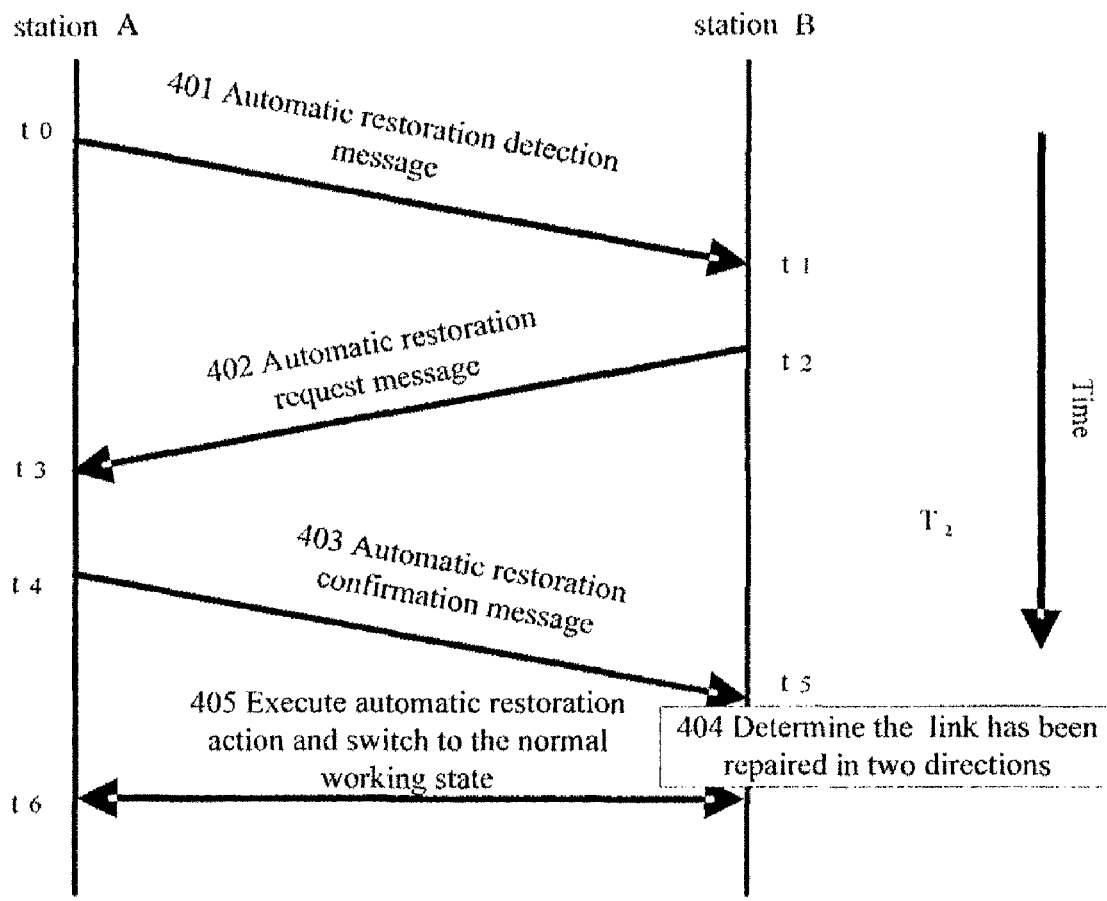
FIG. 4 is a schematic diagram illustrating an automatic restoration procedure in accordance with a first preferred embodiment of the present invention.

In a first preferred embodiment of the present invention, a failed link between two stations is relatively short. With reference to FIG. 4, the method according to the first preferred embodiment is as follows.

The APR or APSD procedure is started when a failure occurs on a link, for example a fiber on the link is broken. In response to the link failure, station A and station B adjacent to the failed link reduce or close the output power of local optical amplifier, close an auxiliary pump light source such as a RAMAN amplifier or a remotely-pumped amplifier, enter a failure state. The station A and station B start their timers for automatic restore timing respectively.

In 401, suppose station A finishes timing at time t0 first, station A sends to station B an APR or APSD automatic restoration detection message whose optical power is compatible with the safety standard, enters a restoration request waiting state, close the main optical channel, and starts the restoration request waiting state timing. If no automatic restore request message sent by station B is received before the timing expires, station A determines that the link has not been repaired, returns to the failure state, and starts automatic restoration timing again.

In 402, if the link from station A to station B has been repaired, station B receives a signal carrying the automatic restoration detection message at time t1 after a time delay for transferring the automatic restoration detection message, and extracts the APR or APSD automatic restoration detection message from the signal. If no preset automatic restoration detection message is extracted, station B keeps the current state unchanged. If the automatic restoration detection message is extracted, station B determines that the optical fiber link from station A to station B has been repaired, turns on a main optical channel from station B to station A, which is referred to as a reverse main optical channel, modulates an APR or APSD automatic restoration request message to the main optical channel from station B to station A by the method for loading the automatic restoration detection message described in 401, and sends station A the APR or APSD automatic restoration request message at time t2.

After sending the automatic restoration request message, station B enters an automatic restoration confirmation waiting state, closes the main optical channel from station B to station A, and starts the automatic restoration confirmation waiting state timing. If no automatic restoration confirmation message sent by station A is received before the timing expires, station B determines that the link has not been repaired, returns to the failure state, and starts automatic restoration timing again.

In 403, if the optical fiber link from station B to station A has been repaired, station A receives the APR or APSD automatic restoration request message sent by station B at time t3 after a time delay for transferring the automatic restoration request message, determines that the link has been repaired in two directions. Station A turns on the main optical channel again, modulates the APR or APSD automatic restoration confirmation message to the main optical channel by the method for sending an automatic restoration detection message described in 401, and sends the automatic restoration confirmation message to station B at time t4, and the power of the automatic restoration confirmation message is lower than the power threshold for safety.

In 404, after a time delay for transferring the automatic restoration confirmation message, station B receives the automatic restoration confirmation message at time t5, determines that the optical fiber link of failure segment has been repaired in two directions, and turns on the main optical channel from station B to station A and the power on the main optical channel is lower than the power threshold for safety.

In 405, after determining that the optical fiber link of failure segment has been repaired, station A and station B may start a certain automatic restoration waiting timing respectively to avoid problem associated with the instability of the optical fiber link. During the period of the automatic restoration waiting timing, the main optical channel between station A and station B are kept open in two directions, and the power of the main optical channel is lower than the power threshold for safety. If the main optical channel is detected in the two directions respectively at time t6 after the timing expires, station A and station B execute automatic restoration action, increase the power of the main optical channel to the normal case in the two directions, turn on various auxiliary pump sources, and switch to the normal working state, so that the whole automatic restoration procedure is accomplished.

Optionally, after determining that the optical fiber link of failure segment has been repaired, station A and station B may immediately switch to the normal working state in 405.

Figure 5:
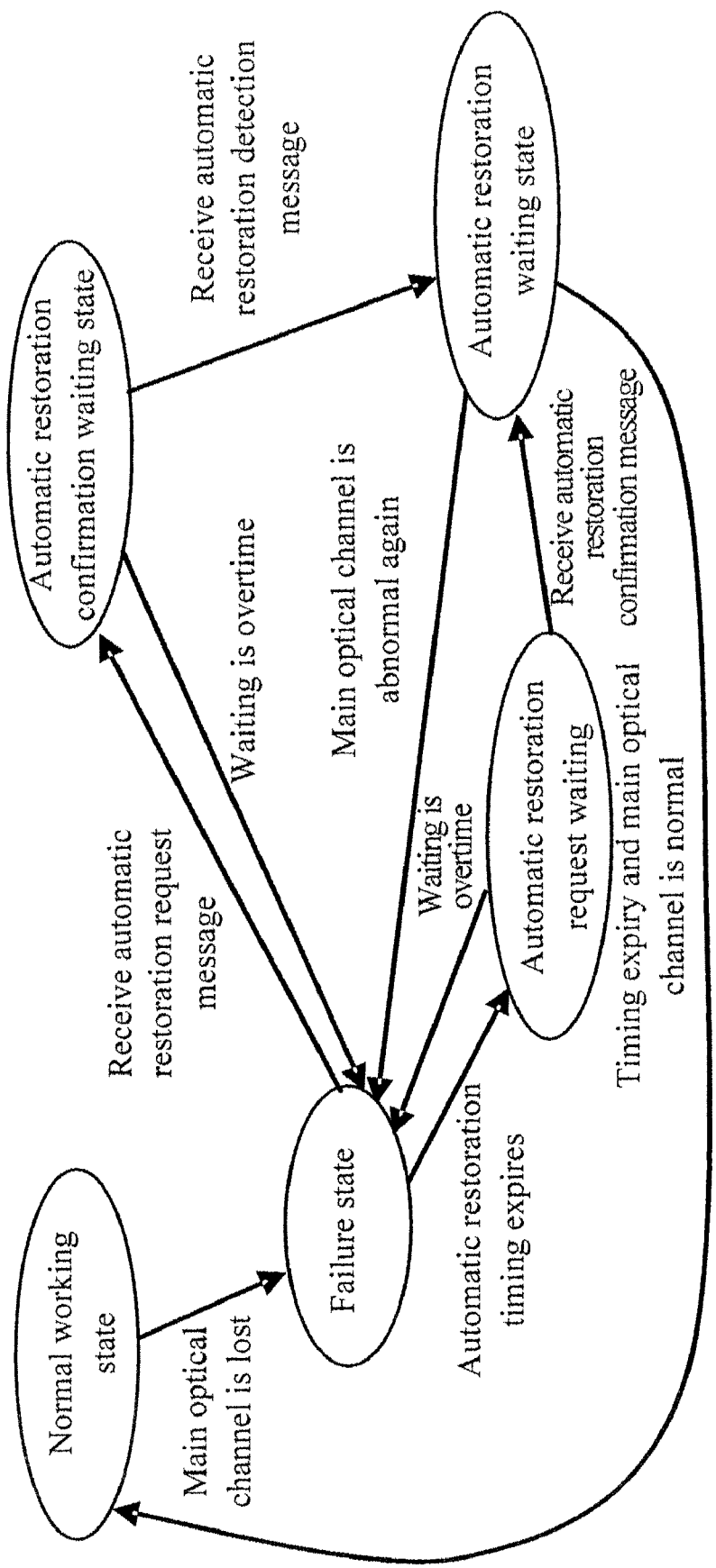
FIG. 5 is a schematic diagram illustrating a state switching of the automatic restoration procedure in accordance with the first preferred embodiment of the present invention.

In the above procedure, the state switching procedure of station A and station B is as shown in FIG. 5.

After a failure occurs in the link, station A and station B switch from the normal working state to the failure state, and start automatic restoration timing respectively. For example, if station A finishes the automatic restoration timing first, station A sends the automatic restoration detection message to station B at the opposite side, enters the automatic restoration request waiting state, and starts the automatic restoration request waiting state timing. If no automatic restoration request message is received before the timing expires, station A returns to the failure state. If the automatic restoration detection message is received, station B sends the automatic restoration request message to station A, enters the automatic restoration confirmation waiting state, and starts the automatic restoration confirmation waiting state timing. If no automatic restoration confirmation message is received before the timing expires, station B returns to the failure state. If the automatic restoration request message is received before the timing expires, station A in the automatic restoration request waiting state enters the automatic restoration waiting state, and starts the automatic restoration waiting timing. If the automatic restoration confirmation message is received before the timing expires, station B in the automatic restoration confirmation waiting state enters the automatic restoration waiting state, and starts the automatic restoration waiting timing. After the automatic restoration waiting timings expire, the two stations switch to the normal working state.

The method for sending such communication messages as the automatic restoration detection message, automatic restoration request message and automatic restoration confirmation message for implementing the automatic restoration between the APR or APSD stations may be implemented by the use of the following schemes.

Station A turns on the main optical channel from station A to station B, and loads an identification signal which represents an APR or APSD automatic restoration communication message on the main optical channel. Or station B turns on the main optical channel from station B to station A, and loads an identification signal which represents an APR or APSD automatic restoration communication message on the main optical channel. The identification signal may be an intensity modulated signal, a set of regular pulse sequences or a Pulse Width Modulated (PWM) signal determined in advance. According to an embodiment, an optical amplifier of station A or station B is enabled to output a series of digital pulse whose power is compatible with the safety standard by controlling a pump source of the optical amplifier. Different digital pulses represent different types of messages. Station B or station A detects these digital pulse signals and acquires the meanings of the digital pulses according to a pre-arranged manner, and execute corresponding actions. According to another embodiment, a variable attenuator of station A or station B is controlled to output a frequency signal whose power is compatible with the safety standard. Different frequency signals represent different types of messages. For example, a 100 kHz continuous wave (CW) signal represents an automatic restoration detection message; a 110 kHz CW signal represents an automatic restoration request message; a 120 kHz CW pulse signal represents an automatic restoration confirmation message. Station B or station A determines the type of a message represented by the CW pulse signal according to the frequency of the CW pulse signal, and performs an action according to the message.

In order to guarantee that station A (or station B) can receive the APR or APSD automatic restoration communication message sent by the station B (or station A), the pulse sequence may be sent repeatedly. The number of the repeat time may be set as three recommended in a preferred embodiment of the present invention. Alternatively, the pulse sequence may be sent repeatedly within a preset time period.

For safety, the power outputted from station A or station B to the main optical channel is lower than a power threshold for safety in this embodiment. For example, the power does not exceed 10 dBm. The power of the communication message sent by station A or station B is lower than normal power when the communication message arrives at station B or station A. To guarantee that station B or station A can extract the identification signal and the APR or APSD automatic restoration communication message carried in the identification signal from a detection pulse sequence, a pulse sequence is preferably used to carry an automatic restoration communication message in an embodiment of the present invention. Station A or station B may adopt deeply modulated on/off mode to modulate the pulse sequence required to the main optical channel. Station B or station A can detect the APR or APSD automatic restoration communication message.

In the above embodiments, station A and station B are usually two stations adjacent to the failed link. The stations may be OTM stations or common optical amplifier stations.

In some links requiring auxiliary pump sources, the distance between automatic restoration launching stations adjacent to a failed link may be relatively long. Without help of the auxiliary pump source, station A and station B can not extract an identification signal and acquire an APR or APSD automatic restoration message by loading the identification signal on the main optical channel even though the modulation depth of the identification signal on the main optical channel is 100%.

Because the detection sensitivity of optical power can reach −70 dBm and the optical power necessary for extracting a MHz or KHz signal is about −55 dBm, when the signal on the main optical channel could not be extracted, optical power detection can be used to determine whether the link has been repaired in one direction. If the link has been repaired in the direction, an auxiliary amplifier such as RAMAN or remotely-pumped source may be firstly restored to increase the optical power received by the station in the direction. The identification signal on the main optical channel and an APR or APSD automatic restoration message carried in the identification signal may be extracted correctly.

Figure 6:
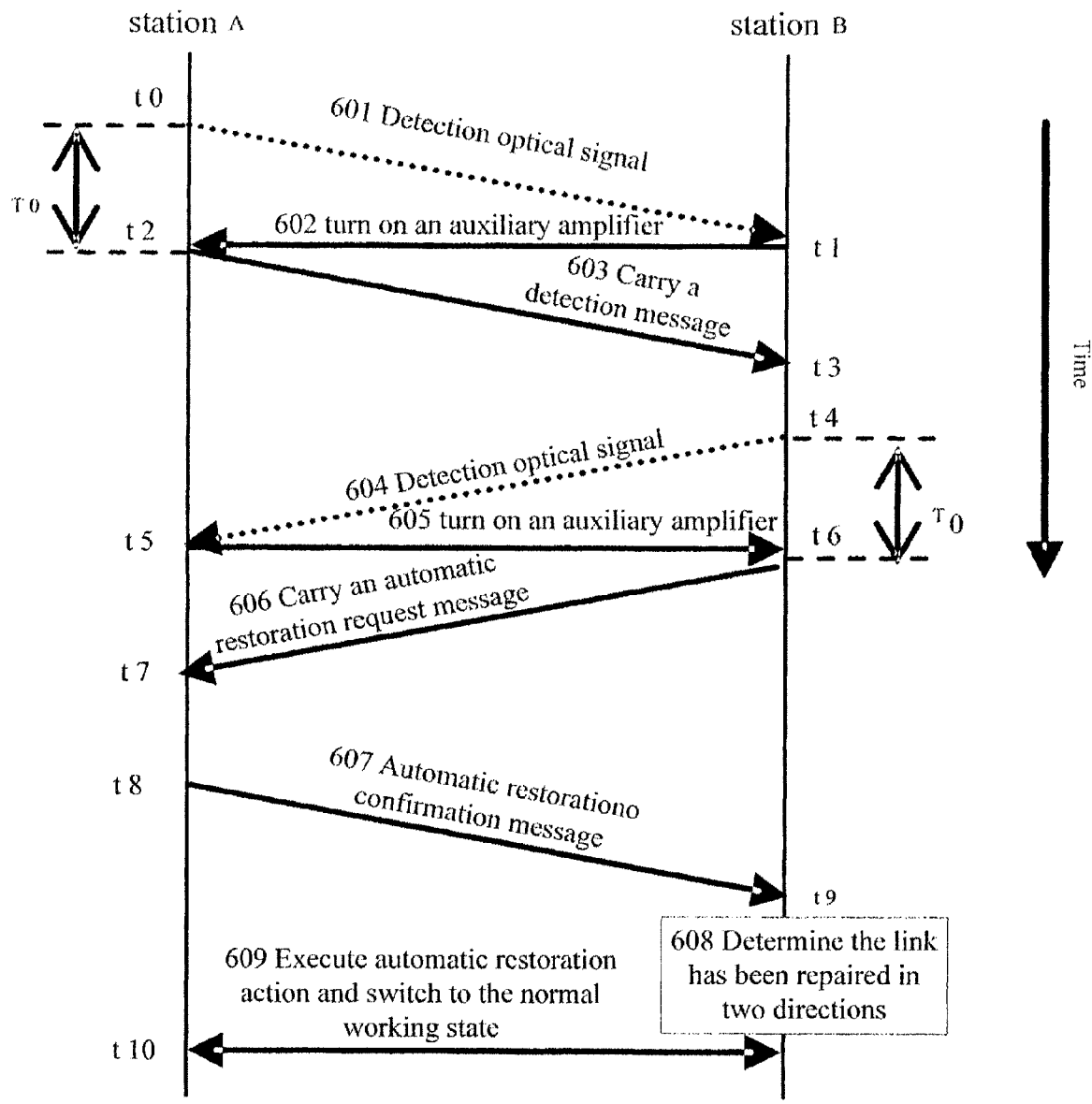
FIG. 6 is a schematic diagram illustrating an automatic restoration procedure in accordance with a second preferred embodiment of the present invention.

In a second preferred embodiment of the present invention, optical power detection is used to turn on the auxiliary facilities; an identification signal on the main optical channel is used to implement interaction of the APR or APSD automatic restoration message. So the APR or APSD automatic restoration procedure can be implemented. The implementing procedure is as shown in FIG. 6.

The APR or APSD procedure is started because of occurrence of a failure in a link. For example, a fiber of the link is broken. In response to the occurrence of the failure in the link, stations A and B adjacent to the failed link reduce or close the output power of local optical amplifier, close an auxiliary pump source such as a RAMAN amplifier or a remotely-pumped amplifier, enter a failure state, and start their timers for automatic restoration timing respectively.

In 601, if station A finishes timing first, station A sends to station B a detection optical signal whose power is compatible with the safety standard at time t0.

The detection optical signal may be a detection light carrying no information.

In 602, if the link has been repaired, station B detects the detection optical signal at time t1 after a time delay for transferring the detection optical signal. In other words, station B detects the increase of the optical power in the link from station A to station B. Station B determines that the optical fiber link from station A to station B has been repaired and no laser leakage danger will occur. An auxiliary amplifier such as a RAMAN amplifier or a remotely-pumped amplifier is turned on to amplify the detection optical signal sent by station A.

In 603, station A waits for a certain time T0 after sending the detection optical signal. The time T0 is longer than a pre-estimated time for station B receiving the detection optical signal sent by station A and initiating pump facilities. At time t2 after the waiting time T0 is over, station A sends to station B an identification signal carrying an APR or APSD automatic restoration detection message by the method for loading the identification signal representing an automatic restoration message on the main optical channel when sending an automatic detection message described in 401.

Because the auxiliary amplifier has been, turned on, station B is enabled to receive an optical signal on the main optical channel at time t3 after a time delay for transferring the optical signal. The intensity of the optical signal is enough to allow station B to extract the identification signal and the APR or APSD automatic restoration message carried in the identification signal.

In response to sending the APR or APSD automatic restoration detection message, station A starts the automatic restoration request waiting state timing, and enters the automatic restoration request waiting state. If no APR or APSD automatic restoration request message is received before the timing expires, station A returns to the failure state, and starts automatic restoration timing again.

In 604, in response to receiving an APR or APSD automatic restoration detection message sent by station A, station B sends a detection optical signal to station A along the optical fiber link from station B to station A at time t4.

In 605, if the optical fiber link from station B to station A has been repaired, station A detects the optical signal, determines that the optical fiber link from station B to station A has been repaired and no laser leakage will occur. A pump source such as a RAMAN amplifier or a remotely-pumped amplifier is turned on at time t5.

In 606, after sending the detection optical signal and waiting for a certain time T0, station B sends station A an identification signal carrying an APR or APSD automatic restoration request message by the method for loading the identification signal on the main optical channel described in

401 at time t6, starts automatic restoration confirmation waiting state timing, and enters the automatic restoration confirmation waiting state. If no automatic restoration confirmation message is received before the timing expires, station B returns to the failure state, shuts down an auxiliary amplifier such as a RAMAN or a remotely-pumped source from station B to station A, and starts automatic restoration timing again.

In 607, after the pump source is turned on, the detection optical signal from station B to station A will be large enough. Station A receives the identification signal at time t7, and extracts the APR or APSD automatic restoration request message from the identification signal. After acquiring the APR or APSD automatic restoration request message, station A determines that the whole link has been repaired. Station A sends station B an APR or APSD automatic restoration confirmation message by loading an identification signal on the main optical channel described in 401 at time t8. The detection optical signal is not needed to send again because station B has turned on the auxiliary amplifier.

In 608, after receiving the APR or APSD automatic restoration confirmation message at time t9, station B determines that the whole link has been completely repaired.

In 609, after waiting for a certain time for avoiding the influence of the instability of the link, station A and station B execute an automatic restoration action and switch to the normal working states at time t10. The message carried by identification signal on the main optical channel and the modulation depth are restored to the original set value.

Optionally, after receiving the APR or APSD automatic restore confirmation message, station A and station B may also switch to the normal working state immediately in 609.

Station A and station BE may be two OTM stations or two optical amplifier stations adjacent to the failed link in this embodiment. Because the distance between the two automatic restoration launching stations is usually long, auxiliary pump sources are set in the optical fiber link to guarantee the normal interaction of optical signal.

The method for loading an identification signal on the main optical channel described in 401, 402, 603, 606 and 607 may be implemented by loading an intensity modulated signal, a pulse width modulated signal or a pulse sequence changed according to a certain rule on the main optical channel in accordance with an embodiment of the present invention.

A simple solution for loading an identification signal on the main optical channel is to load a low amplitude intensity modulated signal on the main optical channel. In other words, the main optical channel is taken as a bearer for carrying an intensity modulated signal. The intensity modulated signal will be received by the downstream station along with the signals of main optical channel. When the intensity modulated signal is detected, the downstream station determines that the signal from the upstream station is normal, thereby determining that there is no failure on the fiber. Two preferred embodiments of this solution are hereafter described in detail.

An optical amplifier is always used in a Wavelength Division Multiplexing (WDM) system to meet the requirement of optical multiplexing and de-multiplexing. The optical amplifier used in the WDM system generally adopts automatic gain control or automatic power control to guarantee that the power of the optical signal of each channel amplified by the optical amplifier keeps steady rather than being affected by adding or dropping the wavelength signals. The principle of both the automatic gain control and the automatic power control is controlling the output power of the pump laser of the optical amplifier to amplify the optical signal.

Figure 7:
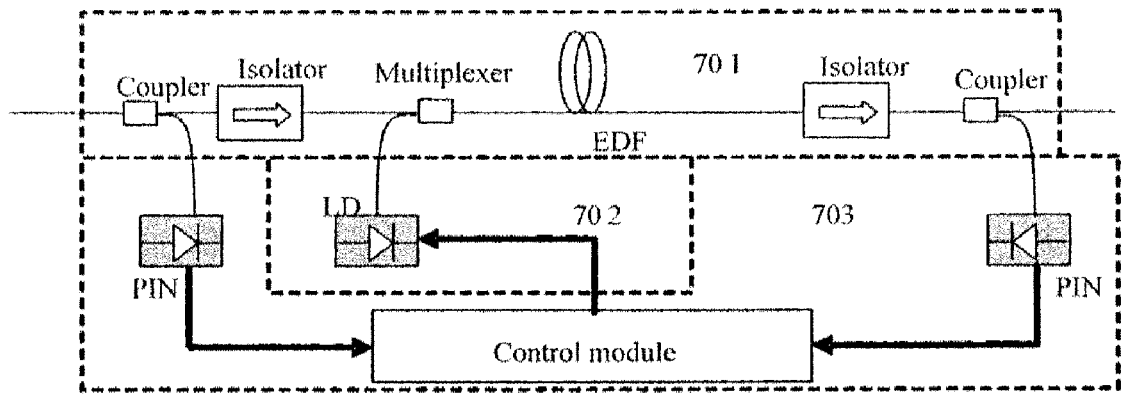
FIG. 7 is a schematic diagram illustrating the structure of an EDFA.

The structure of an optical amplifier is shown in FIG. 7. Taking the most popular EDFA as an example, the optical amplifier is composed of gain component 701, pump laser component 702 and feedback control component 703. The bold line represents electrical signal and the normal line represents optical signal in FIG. 7. Gain component 701 connects to a main optical channel fiber and includes couplers, isolators and an Erbium-Doped Fiber (EDF). Pump laser component 702 is mainly composed of pump laser LDs like semiconductor lasers. Feedback control component 703 is composed of PIN diodes and a control module. A fraction of the input optical signals un-amplified by the optical amplifier and a fraction of the output optical signals amplified by the optical amplifier are split respectively via couplers. After photoelectric conversion by the PIN diode, the signals are inputted to the control module. The control module analyses the input and output signals, controls the pump current outputted to the pump laser LD to generate appropriate pump light intensity, so that the signal light and the pump light are amplified by the EDF in a level as required. The detection of pump light intensity is not illustrated in FIG. 7. In practice, a detection component for detecting the pump light intensity may exist. There may be a plurality of pump lasers.

In view of the above operational principle and feature of optical amplifier, in a first preferred embodiment of the present invention, a low amplitude intensity modulated signal is loaded in the output signal of optical amplifier by the use of the control module of optical amplifier for controlling the output light intensity of the pump laser.

The procedure for loading the low amplitude intensity modulated signal of this embodiment is described as follows in detail with the EDFA as an example. As is well known, the operational principle of EDFA is to pump the erbium ion to its excited state via the pump light; the relaxation time of the erbium ion from its excited state to its meta-stable state is very short, and the erbium ion will self-excite from its excited state to its meta-stable state quickly. Because the relaxation time of the erbium ion from its meta-stable state to its ground state is relatively long, the population inversion occurs between the meta-stable state and the ground state of the erbium ion, and the signal light may be self-amplified via the population inversion of the erbium ion. According to this principle, the control module may indirectly control the inversion population of erbium ion of EDF through controlling the pump current of pump laser, and therefore the gain of signal light passing the optical amplifier can be controlled.

Life time of erbium ion in the meta-stable state, which is about 10 ms, is relatively long. Therefore, if the low amplitude intensity modulation is loaded on the signals of the main optical channel by controlling the pump light output intensity of the pump laser, the time period of signal controlling the pump laser must be longer than life time of the erbium ion in meta-stable state; otherwise, the periodic output change of pump laser induces no periodic change of inversion population of erbium ion; therefore, the low amplitude intensity modulation may not be performed on the output signal of the amplifier. Therefore, a low-frequency and low-amplitude control signal of which the period is longer than 10 ms may be loaded into the pump current in this embodiment, and the change of pump current of pump laser may be controlled by intensity modulation or Pulse Width Modulation (PWM), so that the intensity of the signal light passing the optical amplifier also generates a low-frequency and low-amplitude change. In other words, the identification signal is loaded. The above procedure may be implemented by adding a control signal generating module to the control component of optical amplifier.

Figure 8:
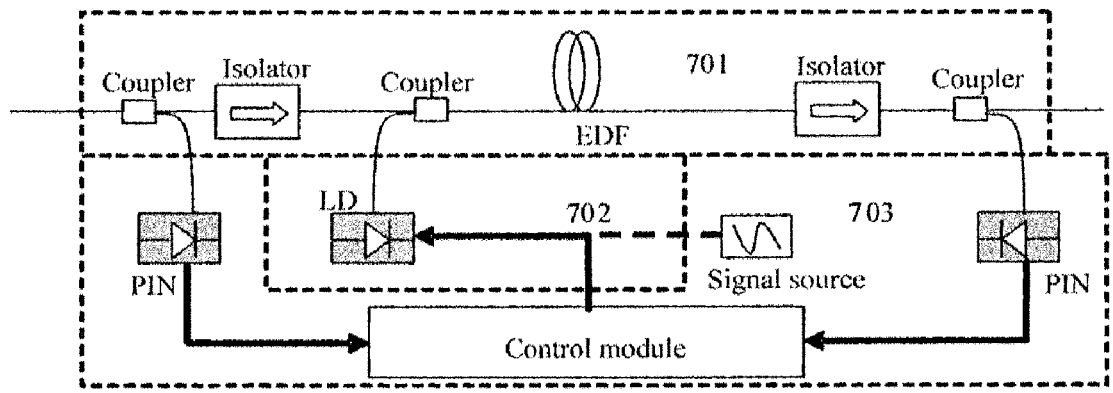
FIG. 8 is a schematic diagram illustrating the structure of an optical amplifier for loading an identification signal on the main optical channel by modulating a pump current in accordance with an embodiment of the present invention.

As shown in FIG. 8, a signal source with low frequency and low amplitude is added in feedback control component 703 as the control signal generating module. The signal source may generate a low-frequency and low-amplitude control signal for intensity modulation or pulse width modulation as required. The wave motion of amplitude and frequency of control signal may be predetermined through calculating according to the features such as amplitude aid frequency of the intensity modulated signal that is required for loading on the main optical channel and the modulation manner. The wave motion of amplitude and frequency of control signal may be predetermined through experimental method as well. The signal source is configured to generate the low-frequency and low-amplitude control signal, and the output of the signal source is loaded to the pump current signal originally outputted by the control module. The pump light intensity outputted by the laser will have a low amplitude and periodic wave motion, thereby inducing the low amplitude wave motion of the intensity of the output optical signal of main optical channel passing the EDFA; therefore the intensity modulated signal is loaded on the main optical channel. The signal source may also connect to a control module which controls the output of the signal source.

Optionally, the control module may be directly controlled to generate the pump current carrying the control signal. For example, a slow-speed control module may be added in feedback control component 703 as the control signal generating module. The slow-speed control module may be a hardware logic module or a software module. In one aspect, the control module keeps the original function of quickly responding for the signal change, for example the input signal power will change when a path of signals are newly added or dropped, the quickly responding function makes the control module immediately adjust the pump current to an appropriate value according to the signal power changes to enable the optical amplifier to correspondingly amplify the signal. In another aspect, the slow-speed control module is driven by time, which slowly and periodically controls the control module to change the pump current in low-amplitude. So that the outputted pump current may be simultaneously controlled by a fast-speed control procedure and a slow-speed control procedure. A similar effectiveness of adding a low-frequency and low-amplitude modulated signal in the pump current of pump laser is achieved. Therefore the low-amplitude modulated signal is loaded on the main optical channel.

Loading the identification signal on the main optical channel is not limited to the manner of controlling the pump of amplifier. In a second preferred embodiment of the present invention, a signal light intensity modulated module, such as a variable attenuator or a variable gain component, is added on the main optical channel to load the identification signal on the main optical channel.

Figure 9:
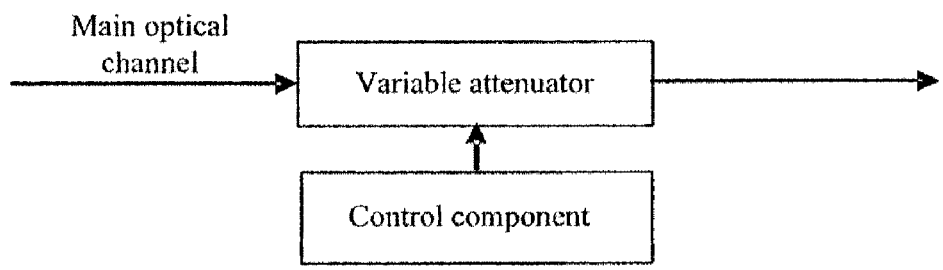
FIG. 9 is a schematic diagram illustrating the principle for loading an identification signal on the main optical channel using a variable attenuator in accordance with an embodiment of the present invention.
Figure 10:
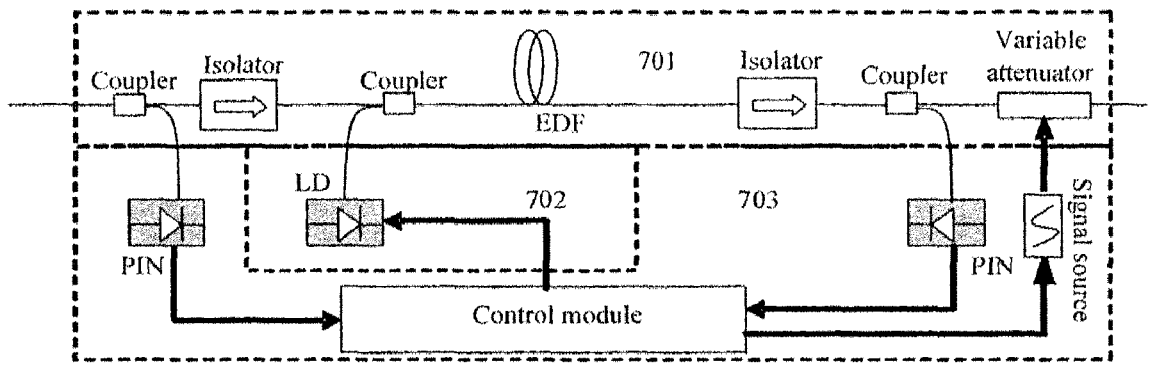
FIG. 10 is a schematic diagram illustrating the structure of al optical amplifier for loading an identification signal on the main optical channel using the variable attenuator in accordance with an embodiment of the present invention.

As shown in FIG. 9, a variable attenuator is adopt as an example, the variable attenuator may be a Mach-Zehnder (MZ) modulator or a Voltage Optical Attenuator (VOA). The variable attenuator may be set at the upstream station side of main optical channel and controlled by a control signal outputted from a control component, and the control signal is the same as the identification signal required. The wave motion of the identification signal induces the change of attenuation of the variable attenuator, so that the wave motion of optical power on the main optical channel can be controlled. Therefore the identification signal is modulated to the main optical channel. Preferably, the variable attenuator may be set at the location for the optical amplifier outputting signal light and be connected with feedback control component 703 of optical amplifier, and be controlled by the control signal outputted from feedback control component 703. In this way, a signal source needs to be added in feedback control component 703 of optical amplifier, and the signal source outputs the control signal to the control terminal of the variable attenuator. Optionally, the signal source may be connected to and controlled by the control module of feedback control component 703 with reference to FIG. 10. As can be seen, the advantage of this preferred embodiment over the first preferred embodiment is that the control signal is generally the same as the identification signal needing to be loaded and the control signal calculation based on the identification signal is unnecessary.

Optionally, the function of the variable attenuator may also be implemented thoroughly via a variable gain component on the main optical channel. The variable gain component may be a semiconductor laser or an EDF etc.

In the preferred embodiments of the present invention, the identification signal carrying the above information is composed of a series of predetermined regular pulse sequences. The modulation method is the same while a pulse signal is used to replace the control signal of the above intensity modulation procedure.

For the purpose of detecting the identification signal of main optical channel from a upstream station, the station filters the detection light by using a filtering module after performing photoelectric conversion of the detection light split from the main optical channel, reserves the signal within the frequency range of the identification signal apart from other frequency band signals and send the signal within the frequency range of the identification signal to the detecting module for detection, and determines whether a predetermined identification signal exists on the main optical channel; if yes, no actions should be taken; otherwise, determines that a failure occurs on the fiber, and initiates the scheduled safety protection procedure.

Figure 11:
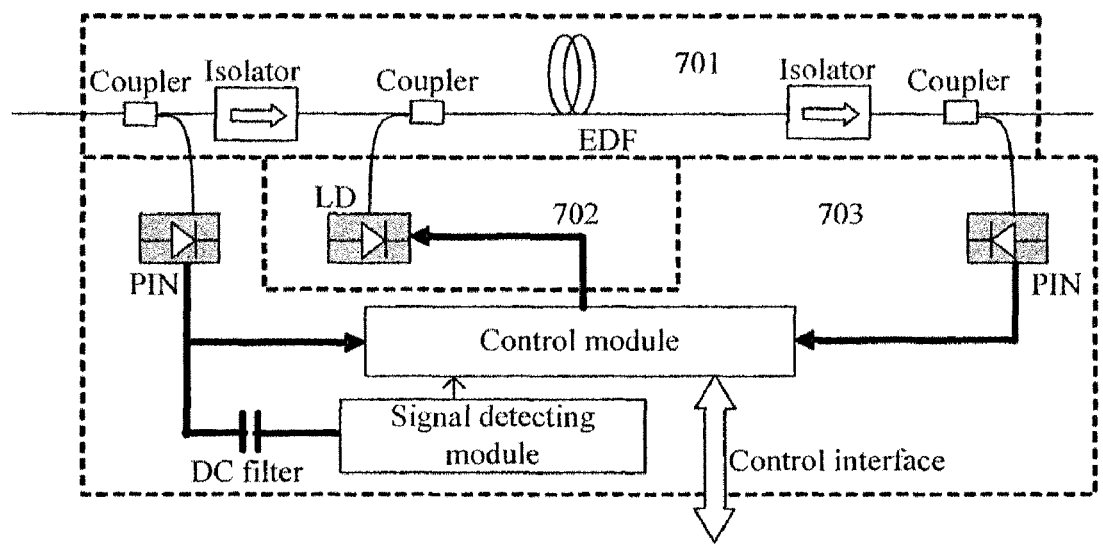
FIG. 11 is a schematic diagram illustrating the structure of the optical amplifier for detecting the identification signal in accordance with an embodiment of the present invention.

Preferably, the above detecting procedure may be implemented in the optical amplifier according to an embodiment of the present invention. As shown in FIG. 11, a direct-current (DC) filter as the filtering module and a signal detecting module are included in feedback control component 703 of the optical amplifier. A portion of optical signal for detection is split via a coupler from the optical signal received by the optical amplifier from the main optical channel in gain component 701. After the optical signal is inputted to a PIN diode for implementing photoelectric conversion, the outputted electric signal is divided into two paths. One path is inputted to the control module and the other path is inputted to the DC filter. After the electric signal is filtered by the DC filter, the detecting module detects the identification signal of main optical channel before reporting the detecting result to the control module. If the detection result indicates that no identification signal of main optical channel exists, the control module will send a signal lost alarm to a network main control component via a control interface to induce the APR procedure, and implementing the laser safety protection of optical communication system. After receiving the detecting result of the identification signal restoration of main optical channel, the control module may send to the network main control component information indicating that the system resumes normal to initiate the automatic restoration procedure of the whole system. Optionally, the filtering module may also be implemented using a low-frequency band-pass filtering module within the frequency range of the identification signal.

Optionally, the signal detecting module may determine whether the identification signal of main optical channel exists through directly detecting the received analog signal to determine whether a low-frequency signal is contained therein, or determine whether the identification signal of main optical channel exists according to the received digital signal result after performing analog-digital conversion of the received analog signal. Generally, the digital identifier detection is more reliable thin the analog identifier detection.

Further, a timing function is needed in an optical amplifier in accordance with the embodiments of the present invention to support the timing operation of each step in the above automatic restoration methods. The timing function may be implemented by setting a timer in an optical amplifier or implemented by software provided by the control module, which is a common manner in the prior art and will not be detailed.

Other types of optical amplifiers like rare earth element doped amplifiers or semiconductor optical amplifiers apart from EDFA may also be used its the optical amplifier for implementing the transmitting and detecting function of identification signal according to an embodiment of the present invention except the optical amplifier amplifies the optical signal by inputting the pump light to the transmission fiber between stations.

The above is the description of the detailed embodiments of the present invention. The method and the device of the present invention can be modified appropriately during a specific implementation, to meet the specific requirements of the specific cases. It is thereby understood that the detailed embodiments according to the present invention are just demonstrative of, but not limitative to the protection scope of the present invention.

What is claimed is:

1. An automatic restoration method of optical communication system, comprising:
    after a link fails in an optical communication system, centering a failure state by a first automatic restoration launching station adjacent to the failed link;
    sending, by the first automatic restoration launching station, an automatic restoration detection message whose optical power is compatible with a safety standard to a second automatic restoration launching station at the opposite side of the failed link;
    in response to receiving an automatic restoration request message from the second automatic restoration launching station, determining, by the first automatic restoration launching station, the link has been repaired in two directions between the first automatic restoration launching station and the second automatic restoration launching station;
    sending an automatic restoration confirmation message whose optical power is compatible with a safety standard to the second automatic restoration launching station; and
    switching to a normal working state by the first automatic restoration launching station;
    wherein the sending one of the automatic restoration detection message, and the automatic restoration confirmation message comprises:
    turning on, by the first automatic restoration launching station, a main optical channel to the second automatic restoration launching station;
    loading an identification signal representing one of the automatic restoration detection message, and the automatic restoration confirmation message on the main optical channel; and
    adjusting the main optical channel power to be compatible with the safety standard.

2. The method of claim 1, wherein the first and second automatic restoration launching stations are selected from the group consisting of two optical amplifier stations adjacent to the failed link, and two Optical Terminal Multiplexing (OTM) stations adjacent to the failed link.

3. The method of claim 1, further comprising:
    after sending the automatic restoration detection message to the second automatic restoration launching station, starting timing by the first automatic restoration launching station; if no automatic restoration request message is received before the timing expires, determining that the link has not been repaired, and staring the automatic restoration timing again.

4. The method of claim 1, further comprising:
    starting automatic restoration timing after the link fails in the optical communication system, and after the timing expires, sending by the first automatic restoration launching station, the automatic restoration detection message to the second automatic restoration launching station.

5. The method of claim 1, further comprising:
    before switching to the normal wording state, keeping the failure state for a preset time by the first automatic restoration launching station.

6. The method of claim 1, wherein the switching to the normal working state by the first automatic restoration launching station comprises:
    increasing, by the first automatic restoration launching station, the power on the main optical channel to a normal value.

7. An automatic restoration method of optical communication system, comprising:
    after a link fails in an optical communication system, centering a failure state by a first automatic restoration launching station adjacent to the failed link;
    sending, by the first automatic restoration launching station, an automatic restoration detection message whose optical power is compatible with a safety standard to a second automatic restoration launching station at the opposite side of the failed link;
    in response to receiving an automatic restoration request message from the second automatic restoration launching station, determining, by the first automatic restoration launching station, the link has been repaired in two directions between the first automatic restoration launching station and the second automatic restoration launching station;
    sending an automatic restoration confirmation message whose optical power is compatible with a safety standard to the second automatic restoration launching station; and
    switching to a normal working state by the first automatic restoration launching station;
    the method further comprising:
    starting automatic restoration timing by the first automatic restoration launching station after entering the failure state;
    sending, by the first automatic restoration launching station, a first detection optical signal whose optical power is compatible with the safety standard to the second automatic restoration launching station, and waiting for a preset time;
    in response to detecting a second detection optical signal, turning on, by the first automatic restoration launching station, an auxiliary pump source on the link from the first automatic restoration launching station to the second automatic restoration launching station.

8. The method of claim 7, wherein the sending one of the automatic restoration detection message, and the automatic restoration confirmation message comprises:
   turning on, by the first automatic restoration launching station, a main optical channel to the second automatic restoration launching station;
   loading an identification signal representing one of the automatic restoration detection message, and the automatic restoration confirmation message on the main optical channel, and
   adjusting the main optical channel power to be compatible with the safety standard.

9. The method of claim 8, wherein the identification signal is selected from the group consisting of an intensity modulated signal, a pulse sequence and a pulse width modulated signal.

10. The method of claim 7, wherein the sending the first detection optical signal comprises:
   turning on, by the first automatic restoration launching station, a main optical channel to the second automatic restoration launching station;
   adjusting the power on the main optical channel to be compatible with the safety standard, and loading the first detection optical signal on the main optical channel; and
   detecting the second detection optical signal comprising:
   determining, by the first automatic restoration launching station, the second detection optical signal is received if the power in the link is detected to be increased.

11. The method of claim 10, wherein the first detection optical signal is selected from the group consisting of an intensity modulated signal, a pulse sequence and a pulse width modulated signal.

12. An automatic restoration method of optical communication system, comprising:
   after a link fails in an optical communication system, entering a failure state by a second automatic restoration launching station adjacent to the failed link;
   in response to receiving an automatic restoration detection message from a first automatic restoration launching station, determining, by the second automatic restoration launching station, that the link has been repaired in a direction from the first automatic restoration launching station to the second automatic restoration launching station;
   sending an automatic restoration request message whose optical power is compatible with the safety standard to the first automatic restoration launching station; in response to receiving an automatic restoration confirmation message from the first automatic restoration launching station, determining, by the second automatic restoration launching station, the link has been repaired in two directions between the first automatic restoration launching station and the second automatic restoration launching station; and
   switching to a normal working state by the second automatic restoration launching station;
   wherein the sending the automatic restoration request message comprises:
   turning on, by the second automatic restoration launching station, a main optical channel to the first automatic restoration launching station;
   loading an identification signal representing the automatic restoration request message on the main optical channel, and
   adjusting the main optical channel power to be compatible with the safety standard.

13. The method of claim 12, wherein the first and second automatic restoration launching stations are selected from the group consisting of two optical amplifier stations adjacent to the failed link, and two Optical Terminal Multiplexing (OTM) stations adjacent to the failed link.

14. The method of claim 12, further comprising:
   after sending the automatic restoration request message to the first automatic restoration launching station,
   starting timing by the second automatic restoration launching station; if no automatic restoration confirmation message is received before the timing expires, determining that the link has not been repaired, and staring the automatic restoration timing again.

15. The method of claim 12, further comprising: before switching to the normal working state, keeping the failure state for a preset time by the second automatic restoration launching station.

16. The method of claim 12, wherein the switching to the normal working state by the second automatic restoration launching station comprises:
   increasing, by the second automatic restoration launching station, the power on the main optical channel to a normal value.

17. An automatic restoration method of optical communication system, comprising:
   after a link fails in an optical communication system, entering a failure state by a second automatic restoration launching station adjacent to the failed link;
   in response to receiving an automatic restoration detection message from a first automatic restoration launching station, determining, by the second automatic restoration launching station, that the link has been repaired in a direction from the first automatic restoration launching station to the second automatic restoration launching station;
   sending an automatic restoration request message whose optical power is compatible with the safety standard to the first automatic restoration launching station; in response to receiving an automatic restoration confirmation message from the first automatic restoration launching station, determining, by the second automatic restoration launching station, the link has been repaired in two directions between the first automatic restoration launching station and the second automatic restoration launching station; and
   switching to a normal working state by the second automatic restoration launching station;
   the method further comprising:
   in response to receiving a first detection optical signal from the first automatic restoration launching station, turning on, by the second automatic restoration launching station, an auxiliary pump source on the link from the second automatic restoration launching station to the first automatic restoration launching station; and
   sending, by the second automatic restoration launching station, a second detection optical signal whose optical power is compatible with the safety standard to the first automatic restoration launching station, and waiting for a preset time.

18. The method of claim 17, wherein the sending the automatic restoration request message comprises:
   turning on, by the second automatic restoration launching station, a main optical channel to the first automatic restoration launching station;
   loading an identification signal representing the automatic restoration request message on the main optical channel, and adjusting the main optical channel power to be compatible with the safety standard.

19. The method of claim 18, wherein the identification signal is selected from the group consisting of an intensity modulated signal, a pulse sequence and a pulse width modulated signal.

20. The method of claim 17, wherein the detecting the first detection optical signal comprising:
   determining, by the second automatic restoration launching station, the first detection optical signal is received if the power in the link is detected to be increased;
   the sending the second detection optical signal comprises:
   turning on, by the second automatic restoration launching station, a main optical channel to the first automatic restoration launching station;
   adjusting the power on the main optical channel to be compatible with the safety standard, and loading the second detection optical signal on the main optical channel.

21. The method of claim 20, wherein the second detection optical signal is selected from the group consisting of an intensity modulated signal, a pulse sequence and a pulse width modulated signal.

22. A method for automatic restoration detection of optical communication system after a link fails, comprising:
   detecting, by a first automatic restoration launching station adjacent to the failed link, an identification signal, loaded by a second automatic restoration launching station at the opposite side of the failed link, on a main optical channel whose optical power is compatible with a safety standard, wherein the identification signal represents an automatic restoration detection message;
   if the identification signal is detected, determining, by the first automatic restoration launching station, that the link has been repaired in the direction from the second automatic restoration launching station to the first automatic restoration launching station;
   wherein the identification signal is an intensity modulated signal; and
   wherein the identification signal is loaded on the main optical channel by controlling the wave motion of the intensity of pump light of an optical amplifier of the automatic restoration launching station at one side to enable signal light of the main optical channel to generate a wave motion in compliance with the wave motion of the intensity modulated signal.

23. The method of claim 22, wherein the optical amplifier comprises a rare earth element doped amplifier, and the period of wave motion of the intensity of the pump light is longer than the life of high-energy particle of the rare earth element in an excited state in the optical amplifier.

24. The method of claim 22, wherein the identification signal is loaded on the main optical channel by:
   setting a signal light intensity modulation module on the main optical channel, and controlling, by the first automatic restoration launching station, the signal light intensity modulation module to enable an optical signal on the main optical channel to generate a wave motion in compliance with the wave motion of the intensity modulated signal.

25. The method of claim 24, wherein the signal light intensity modulation module comprises one of a variable attenuator and a variable gain device.

26. The method of claim 24, wherein the frequency of the intensity modulated signal is at or below Megahertz level.

27. The method of claim 22, wherein detecting the identification signal by the first automatic restoration launching station comprises:
   converting an optical signal on the main optical channel received by the first automatic restoration launching station to an electrical signal by photoelectric conversion;
   filtering, by the first automatic restoration launching station, the electrical signal to get a signal within an identification signal frequency band, and determining whether the signal within the identification signal frequency band is the identification signal representing an automatic restoration detection message.

28. The method of claim 27, further comprising:
   performing analog-digital conversion for the filtered electrical signal before determining whether the signal within the identification signal frequency band is the identification signal.

* * * * *